United States Patent [19]
Hammer

[11] Patent Number: 5,315,751
[45] Date of Patent: May 31, 1994

[54] METHOD OF FABRICATING A COMBINED LINEAR-ROTARY DIRECT DRIVE STEP MOTOR

[75] Inventor: Robert Hammer, Brookfield, Conn.

[73] Assignee: International Business Machines Corporation, Armonk, N.Y.

[21] Appl. No.: 790,903

[22] Filed: Nov. 8, 1991

Related U.S. Application Data

[62] Division of Ser. No. 602,562, Oct. 24, 1990, Pat. No. 5,093,596.

[51] Int. Cl.⁵ .............................................. H02K 15/02
[52] U.S. Cl. ......................................... 29/598; 29/596
[58] Field of Search ..................... 29/596, 598; 310/12, 310/49 R, 49 A, 191; 318/35

[56] References Cited

U.S. PATENT DOCUMENTS

| | | | |
|---|---|---|---|
| 4,099,106 | 7/1978 | Nikaido | 310/49 R X |
| 4,197,488 | 4/1980 | Kant | 310/12 X |
| 4,563,602 | 1/1986 | Nagasaka | 310/12 |

FOREIGN PATENT DOCUMENTS

04995 10/1979 European Pat. Off. .

Primary Examiner—Carl E. Hall

[57] ABSTRACT

A combined linear-rotary direct drive step motor, having a rotary section and a linear section in a single housing, comprising a cylindrically shaped variable reluctance linear step motor; a modified hybrid permanent-magnet rotary step motor; and a common shaft shared by said linear step motor and said rotary step motor. The teeth of the rotary motor are circumferentially spaced around the stator pole faces and rotor; while in the linear portion of the motor, the teeth are longitudinally spaced along the face of the stator poles and rotor. Except for the teeth, the shape of the stator poles in the rotary and linear sections are identical. The laminated stators and rotors reduce eddy current losses at high stepping speeds. The stator coils of both motor sections are separate and can be energized independently allowing any combination of rotary or linear motion. According to alternative embodiments of the motor, the rotor is fabricated from stacked laminations, in a waffle board like configuration.

10 Claims, 5 Drawing Sheets

METHOD OF FABRICATING A COMBINED LINEAR-ROTARY DIRECT DRIVE STEP MOTOR

This application is a division of application Ser. No. 07/602,562 filed Oct. 24, 1990, now U.S. Pat. No. 5,098,596.

BACKGROUND OF THE INVENTION

1. Field of the Invention

The invention relates generally to motors which provide both linear and rotary motion. More particularly, the invention relates to a combined linear-rotary direct drive step motor that is capable of providing both unrestricted rotary motion and stepped linear motion over a predefined range, for example, along a portion of the longitudinal axis of the rotor shaft.

2. Description of the Related Art

Often in robotics applications it is necessary to provide both rotary and linear motion to an end effector (e.g., vacuum pickup, etc.) mounted on a robot arm. These dual motions are typically obtained by use of some combination of motors, linkages and hydraulic or pneumatic cylinders, etc. The closeness of these movements to the object increases resolution, sensitivity, and the speed of the operation. It would greatly reduce the complexity and size of the mechanism if the rotary and linear functions could be combined in a single compact housing mounted at the end of the robot arm to provide direct drive positioning of the end effector.

Many techniques and devices are known for providing either rotary or linear motion (but not both in combination using a single housing) as, for example, those described in U.S. Pat. No. 3,441,819 to A. Palmero; and U.S. Pat. No. 3,453,510 to K. G Kreuter et al.

Palmero describes a reciprocating linear motor, utilizing a solid armature with a laminated stator, for producing small, discrete linear steps. The techniques described for producing linear motion rely on the rotation of a rotor cooperating with a stator in which both the rotor and stator are formed with teeth, with the teeth of one being in radial planes and the teeth of the other lying on a helical path. Energization of the stator causes a linear movement of the rotor.

The helical threads required by Palmero, prevent the use of a laminated rotor. This is problematic because high eddy current losses are likely to result from the use of a non-laminated rotor. Such losses affect the ability to operate stepper motors at high speeds.

The Kreuter et al patent separately describes both linear and rotary motors. The linear motor utilizes helical teeth cut in the stator. The rotor and stator are solid (not laminated). Fabrication of the motor is relatively expensive when compared to motors fabricated from laminations and the eddy current loss problem referred to hereinabove remains unsolved.

Karidis and Pawletko, in an article entitled "A Radial-Pole Linear Reluctance Motor", teach a variable reluctance motor which utilizes a complex double helix arrangement for providing linear motion only. The linear motor utilizes a laminated armature assembly which is physically similar to the stator assembly of a conventional rotary variable reluctance motor to allow for economical, high volume production.

The stator bar for the motor taught by Karidis and Pawletko consists of a round shaft or tube having a double helical groove on its surface. External roller bearings of conventional linear motor designs are eliminated and replaced with sliding contact between the armature assembly and the stator shaft.

However, the double helical groove arrangement taught by Karidis and Pawletko is difficult to fabricate. Additionally, although the armature assembly is laminated, the rotor taught in the reference is of necessity solid (e.g., not laminated) further subjecting the motor taught to the aforementioned high eddy current losses, etc.

Prior art mechanisms are also known that do provide both rotary and linear motion in a single housing. For example Kant, in U.S. Pat. No. 4,197,488, describes a motor that combines the desired stepped linear and unrestricted rotary motions utilizing a single housing. However, the aforementioned problems relating to eddy current loss and fabrication cost are not solved by Kant. Neither the stator or armature used by Kant are formed from laminations (helical teeth are used).

Kelby et al, Jr. in U.S. Pat. No. 3,745,433, describes a positioning mechanism capable of providing such motion. The positioning mechanism described utilizes an electrodynamic device (a moving coil), rather than an electromagnetic device. It is not a stepping motor, where positions are controlled by a number of pulses, and so encoding of both the rotary and linear positions is required. This is accomplished by the use of potentiometers that are coupled to the drive by rack and pinion gears.

Further yet, it is an object of the invention to provide a combined linear-rotary direct drive step motor that may be readily mass produced with the same production tooling used for rotary motors. In particular, it is an object of the invention to provide techniques for fabricating the motors contemplated by the aforestated objectives utilizing laminations of thin magnetic sheet material that can be mass produced, for example, via well known stamping techniques.

According to one embodiment of the invention, a combined linear-rotary direct drive step motor is set forth comprising a cylindrically shaped variable reluctance linear step motor; a modified hybrid permanent-magnet rotary step motor; and a common shaft shared by said linear step motor and said rotary step motor.

Furthermore, according to a preferred embodiment of the invention, the aforementioned step motors are combined in a single compact housing and are very similar except for the arrangement of teeth. In particular, the teeth of the rotary motor are circumferentially spaced around the face of the stator poles and rotor (as in prior art rotary step motors); whereas, in the linear portion of the motor, the teeth are longitudinally spaced along the face of the stator poles and rotor. Except for the teeth, such a motor in a single compact housing utilizing a laminated core to minimize the aforementioned eddy current loss and stepper motor speed problems, and keep fabrication costs to a minimum.

SUMMARY OF THE INVENTION

It is an object of the invention to provide a compact combined linear-rotary direct drive step motor that provides both unrestricted rotary motion and stepped linear motion over a predefined range without the use of gears, rack and pinions, etc.

It is a further object of the invention to provide a combined linear-rotary direct drive step motor in which the stator coils in the linear and rotary sections are capable of being independently energized to achieve any combination of rotary and/or linear motion (within the aforementioned predefined range).

It is still a further object of the invention to provide a linear-rotary direct drive step motor having a linear step motor portion and a rotary step motor portion sharing a common shaft in a single housing. is non-laminated, increasing the potential for the aforementioned high eddy current losses, lower maximum stepping speed, etc.

An article by Higuchi et al, published in the Official Proceedings of the Twelfth Annual Motor-Con '88 Conference, June 1988, teaches a magnetic suspension type motor element which provides unrestricted rotary motion. A form of linear motion is also provided (a linear thrust).

Higuchi et al's rotor element is thrust (not stepped) longitudinally along the axis of the rotor shaft to essentially a fixed linear position (i.e., a position from which it cannot be linearly stepped). The rotor element is magnetically suspended in a fixed radial position in order to centrally locate the shaft. Accordingly, although Higuchi et al does teach a motor that provides a form of linear motion (thrust) combined with unrestricted rotary motion, the desired linear stepping capability, over a predefined range, combined with unrestricted rotary motion, is not taught.

In view of all of the above, it would be desirable to provide a combined linear-rotary direct drive step motor that can produce unrestricted rotary motion in combination with stepped linear motion over a predefined range. Furthermore, it would be desirable to be able to fabricate A direct drive stepper motor based mechanism in any motor that provides the desired combination of rotary and linear motion would be effective in eliminating the need for the aforesaid encoding, potentiometers, rack and pinion gears, etc.

B. A. Sawyer, in U.S. Pat. No. 3,376,578 describes a two axis (x-y) positioning device for driving chart plotters and other devices. The device comprises a marker carrying head floated on an air bearing over a platen with no mechanical interconnections. A plurality of electromagnets in the head and means for selectively energizing the electromagnets to move the head across the magnetic platen, and along both axes simultaneously if desired, is described.

Sawyer teaches the use of a grid of non-magnetic material enclosing zones of magnetic material in the platen with the grid defining a first axis and a second axis in the plane of the surface over which movement is desired.

Although the Sawyer device is electromagnetic, utilizing stepper motors to provide motion in a plane; it does not provide the desired degrees of freedom to permit the desired combination of both rotary and linear motion. Additionally, the particular "waffle board" arrangement of the platen taught by Sawyer is complex to manufacture and the shape of the stator poles in the rotary and linear sections of the new motor are identical.

Still further, according to the aforementioned preferred embodiment of the invention, the stator and rotor of both motor sections are laminated to reduce eddy current losses at high stepping speeds, and the stator coils of both motor sections are separate and can be energized independent of each other, allowing any combination of rotary or linear motion.

Further yet, according to an alternate embodiment of the invention, the rotor is fabricated from stacked laminations, in a waffle board like configuration. Such a motor contains no magnets in the rotor and operates as a variable reluctance motor. The rotor laminations are identical for both rotary and linear motion. Accordingly, the rotor can be made as long as necessary and the stroke is not limited to the length of the stator.

A preferred embodiment of the invention features the use, in the linear portion of the motor, of phases located around the stator; as compared to prior art linear motors which have phases distributed axially. This feature makes the design of the linear motor similar to the design of conventional rotary step motor stators, allowing the same tooling that is utilized to fabricate the rotary step motor to be used to fabricate the linear step motor.

Furthermore, a preferred embodiment of the invention features a combined linear-rotary stepper motor that provides linear motion directly, i.e., without gears, rack and pinions, etc.; a single housing for the two motor sections which reduces the overall size of the novel motor; and a design simplicity which is low cost and can be fabricated utilizing existing techniques.

Still further, the preferred embodiment of the invention features a motor in which the stator and the rotor of both motor sections are laminated to eliminate eddy current losses at high stepping speeds, and a motor which is capable of providing any combination of both rotary and linear motion (limited only by the predefined range over which linear motion is allowed).

The alternate embodiment of the invention, referred to hereinabove, features a motor in which the rotor is filled with a non-magnetic material that may be machined to a smooth surface so that air bearings may be used for suspension at both ends of the motor. Furthermore, according to this alternate embodiment of the invention, the motor may be fabricated by stacking laminations that can be easily mass produced.

These and other objects and features of the present invention will be recognized by those skilled in that art upon reviewing the detailed description set forth hereinafter in conjunction with the accompanying Drawing.

DETAILED DESCRIPTION

Figures 1A, 3:
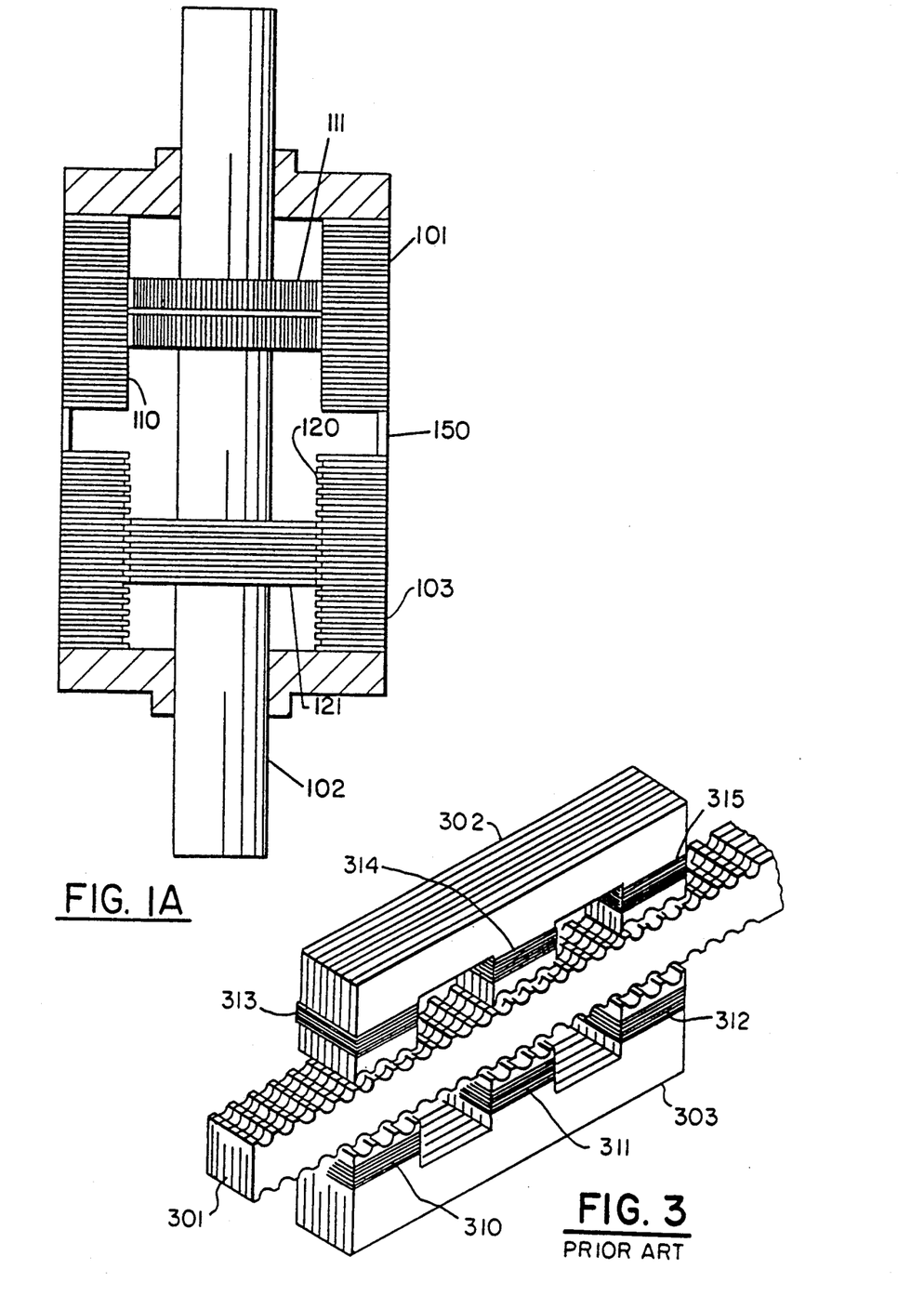
FIGS. 1A and 1B depict, in accordance with a preferred embodiment of the invention, a portion of a modified three-phase hybrid permanent-magnet rotary step motor sharing a common shaft with a three-phase variable reluctance linear step motor. One coil of each section is shown in an isometric view.
FIG. 3 depicts a prior art three-phase linear step motor with the phases arranged longitudinally.
Figure 1B:
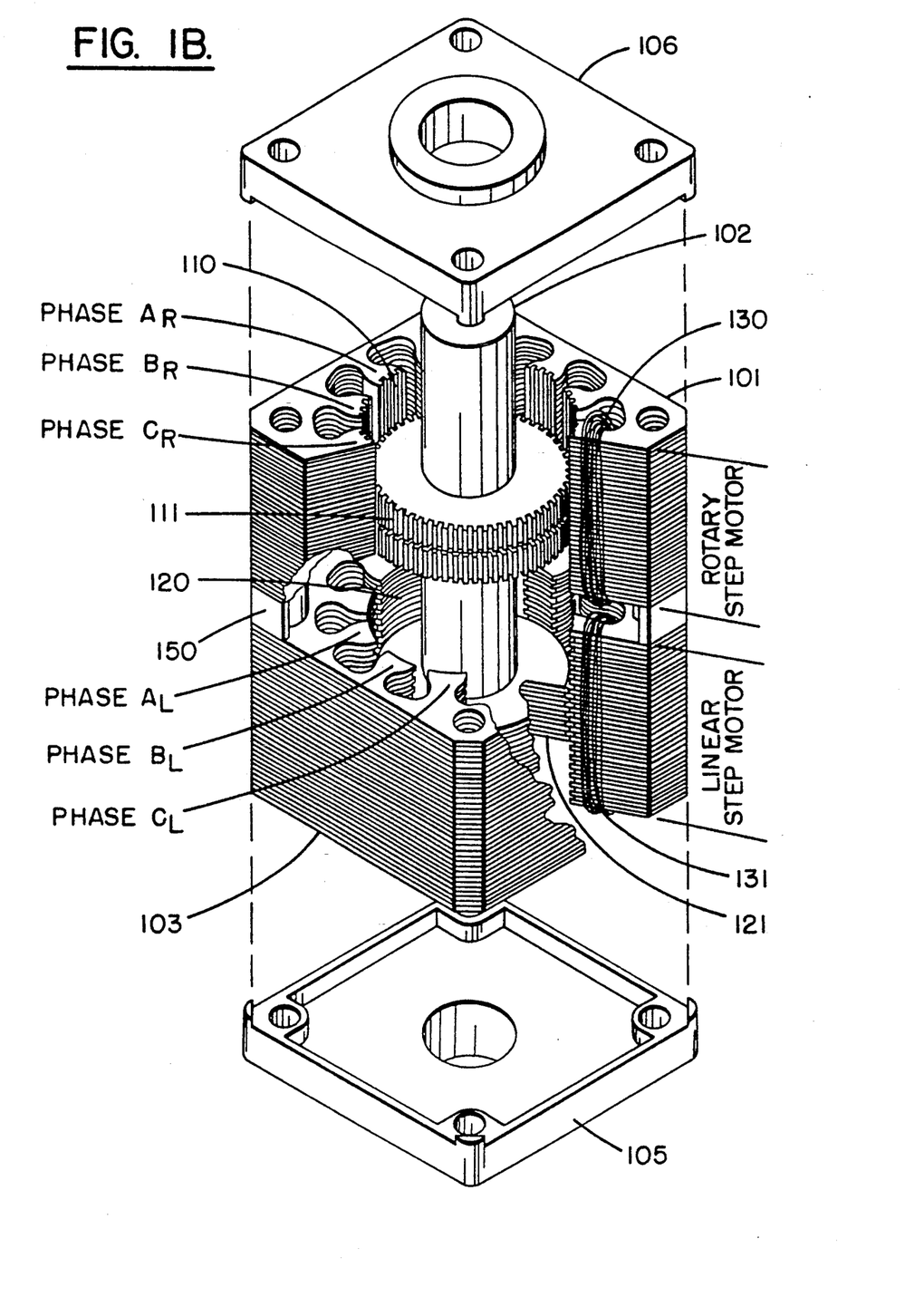

FIGS. 1A and 1B depict, in accordance with a preferred embodiment of the invention, a portion of a modified three-phase hybrid permanent-magnet rotary step motor 101, sharing a common shaft, 102, with a three-phase variable reluctance linear step motor, 103.

According to the invention, the step motors depicted in FIG. 1B, for example, are bolted together to form a single entity, sometimes referred to herein as a single housing, with end caps 105 and 106 located on either end of the housing. The step motors are very similar except for the arrangement of the depicted teeth. The teeth of rotary step motor 101, are spaced circumferentially around the stator and rotor, as shown, for example, by reference numerals 110 and 111 respectively, in FIGS. 1A and 1B. In the linear portion of the motor, shown at 103 in FIGS. 1A and 1B, the teeth are spaced longitudinally along the face of the stator poles and rotor as shown, for example, by reference numerals 120 and 121 respectively, in FIGS. 1A and 1B.

Except for the teeth, the shape of the stator poles in both motor sections are identical. The stator and rotor of both motor sections are laminated to reduce eddy current losses at high speed stepping.

The stator coils of both motor sections (sections 101 and 103) are separate and can be energized independent of each other, allowing any combination of rotary or linear motion. The rotary step motor stator coil is shown by reference number 130 in FIG. 1B and the linear step motor stator coil is shown by reference numeral 131 in FIG. 1B. A spacer between the two sections, shown at 150 in FIGS. 1A and 1B, provides room for the two sets of coils.

The rotary motor provides for a full 360 degrees of rotation. According to an alternate embodiment of the invention, however, a hollow shaft might be desired for routing of wiring, etc., in some applications. In this case rotation might necessarily be limited. The linear stroke is limited by the length of the stators.

The motor shaft, being free to rotate and translate along its axis, cannot be supported by normal ball or roller bearing assemblies. In order to provide the requisite support, the invention contemplates the use (in end caps 105 and 106) of self lubricated journal bearings, hydrostatic (air) bearings or linear-rotary bearings, that facilitate linear and rotary motion simultaneously. Such devices are well known to those skilled in that art and do not constitute a part of the invention per se.

The Rotary Step Motor

The operation of hybrid permanent-magnet step motors is well known. In general, when the coils of one phase are energized so as to align the rotor teeth with the stator teeth of that phase, the teeth of other phases will be misaligned. Energizing any other phase will cause rotation, with the direction of rotation depending on the phase switching sequence and the direction of coil current, while the step size depends on the number of phases, poles and teeth. Other methods such as half stepping and microstepping are also well known in the art.

According to the present invention, the stator of the hybrid rotary step motor (and the linear step motor as well), is extended axially (to a predefined length) beyond the length of the rotor to accommodate the linear stroke. In all other aspects the hybrid rotary step motor, according to a preferred embodiment of the invention, is identical to commercially available hybrid rotary step motors and all of the stator laminations in the rotary portion of the motor are identical.

Figure 2:
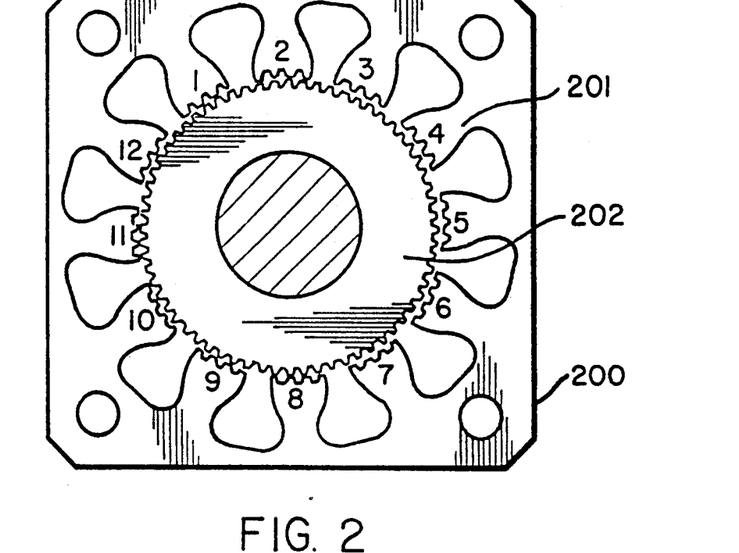
FIG. 2 depicts one lamination of the rotary portion of a motor, showing both the rotor and stator, fabricated in accordance with the teachings of the invention.

Shown in FIG. 2 is one lamination, 200, of the rotary step motor stator (201) and rotor (202). As will be demonstrated hereinafter with reference to the Drawing, similarly shaped stator laminations may be used to provide linear motion.

The illustrative motor depicted in FIG. 1 (fabricated utilizing laminations like lamination 200 shown in FIG. 2) has 12 poles with a 3 phase rotary section. The phases are labeled $A_R$, $B_R$ and $C_R$ in FIG. 1. The poles are labeled, for the sake of illustration only, as poles 1–12 in FIG. 2. Those skilled in the art will readily appreciate that the motor depicted in FIG. 1 fabricated using the type of lamination depicted in FIG. 2, could be, for example, wired as a 4 phase rotary step motor. Other combinations of numbers of poles and phases are possible without departing from the spirit or scope of the invention.

The Linear Step Motor

Various versions of step motors which provide linear strokes are well known to those skilled in the art. For example, a three-phase variable reluctance linear step motor is taught in an article by Pawletko and Chai in "The Theory and Application of Step Motors", at pp 316-326 published by West Publication Company in 1972. This publication is hereby incorporated by reference.

The linear step motor taught by Pawletko and Chai is depicted in FIG. 3 to which reference should now be made. The stator depicted in FIG. 3 at 301 is a rectangularly shaped laminated shaft. A pair of laminated E-cores (302 and 305), spaced and supported by roller bearing suspension, make up the armature, which moves along stator shaft 301. Sequential energization of coils mounted on the E-cores (coils 310–315 of FIG. 3) result in incremental linear motion.

In the Karidis and Pawletko publication described hereinbefore, a radial pole linear reluctance motor is taught consisting of a round stator shaft having a double-helical groove on its surface and a cylindrical armature assembly having internally-radiating poles. The Karidis and Pawletko publication is hereby incorporated by reference.

Although the motors described in the incorporated references provide linear motion; they do not allow for rotary motion. Additionally, the Karidis and Pawletko teaching suffers from other limitations referred to hereinbefore (the need for double helix grooves, the potential for high eddy current losses, etc.).

According to the present invention, the linear step motor portion of the novel motor can be rotated since, as pointed out hereinbefore, the rotary motor section is combined on the same shaft as the linear motor with the design of both motors allowing unimpeded motion of the other. Thus, rotation will not effect linear position, and linear translation will not effect rotary position.

Figure 4A:
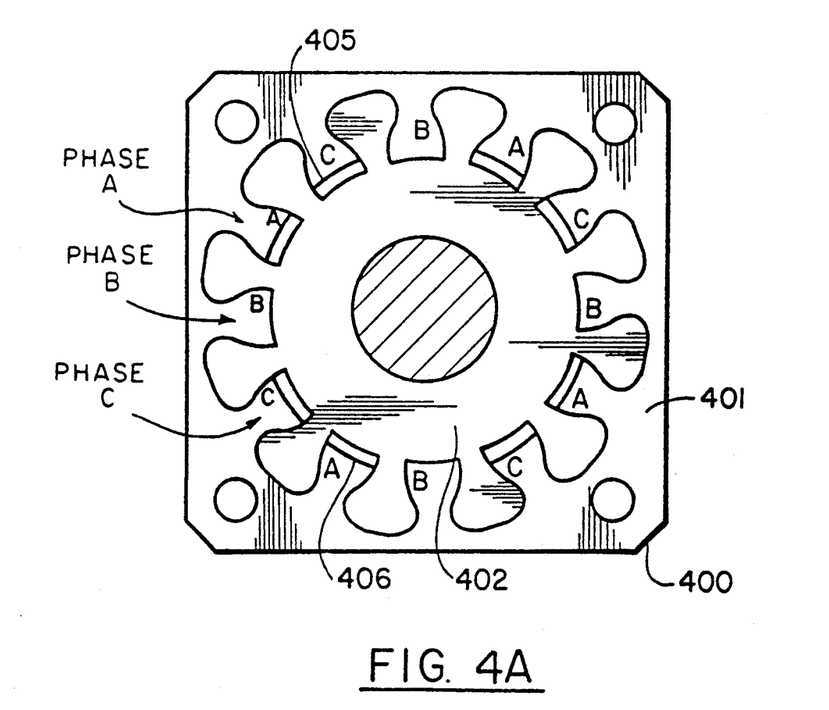
FIG. 4A depicts a portion of a linear step motor, fabricated in accordance with the teachings of the present invention, in which the phases are arranged sequentially around the circumference of the stator.

Also, as indicated hereinbefore, a key feature of the present invention is the configuration of the teeth for the separate phases in both the stator and rotor of the linear motor. According to the invention, the stator and rotor of the linear step motor are formed from laminations, and rather than having three separate sections (one for each phase) arranged longitudinally (as taught by the Pawletko and Chai linear motor depicted in FIG. 3), the phases are arranged sequentially around the circumference of the stator. This is depicted in FIG. 4A. Arranging the phases sequentially around the circumference of the stator reduces the overall length of the linear motor section.

Referring again to FIG. 4A, linear step motor lamination 400 is depicted with phases A, B and C shown on stator 401. These phases correspond to phases $A_L$, $B_L$ and $C_L$ depicted in FIG. 1B. The rotor portion of lamination 400 is depicted at 402 of FIG. 4A.

The required longitudinal shift for each phase shown in FIG. 4A is obtained by forming the stator laminations (like lamination 401) with a slight bend in the teeth, either up or down depending on the phase. Pole faces A and C are shown in FIG. 4A to have "bend lines", such as those shown, for example, at 405 and 406 of FIG. 4A.

Figure 4B:
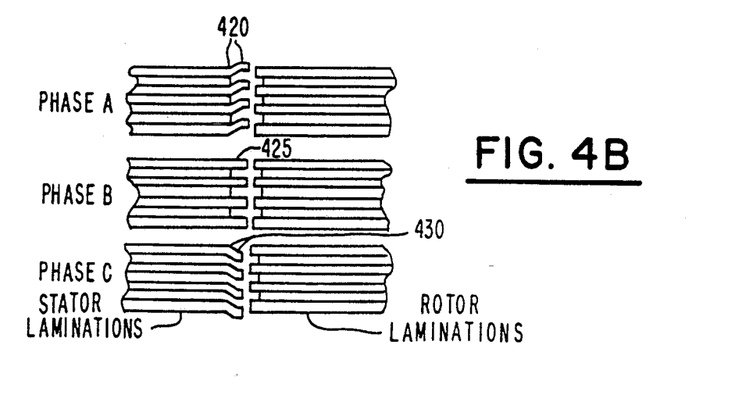
FIG. 4B depicts sections of a linear step motor, fabricated in accordance with the teachings of the invention, in which the displacement of teeth on the stator are shown relative to the rotor.

For the three-phase motor shown in FIG. 4A the teeth of one phase (phase A) are bent up (displaced) $\frac{1}{3}$ of the lamination thickness. The second phase (phase B) has straight teeth (no bend lines are shown for the phase B pole faces shown in FIG. 4A), while phase C has teeth bent down $\frac{1}{3}$ of the lamination thickness. This longitudinal shift in position of the teeth on the stator relative to the teeth on the rotor is depicted in FIG. 4B, where a section from each of the three phases is shown. In particular, the phase A bend lines (two of them) are illustrated at 420 in FIG. 4B, the phase B pole face (with no bend lines) is illustrated at 425, and the phase C bend lines are illustrated at 430.

Those skilled in the art will now readily appreciate that for an n-phase linear step motor, where n is an integer greater than or equal to 3, the teeth associated with each motor phase, according to the invention, are longitudinally displaced from the teeth in each circumferentially adjacent motor phase by 1/n times the lamination thickness.

According to a preferred embodiment of the invention, each lamination 400 of the linear step motor is identical. The spacer between each such lamination 400 is typified by a spacer lamination 500 shown in FIG. 5. The spacer laminations are also identical to each other.

Figure 5:
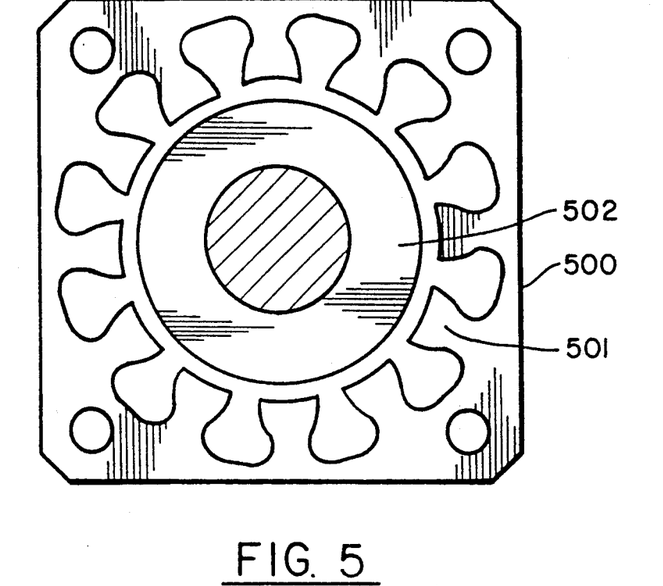
FIG. 5 depicts a linear step motor spacer lamination, showing both the rotor and stator, used in the combined linear-rotary motor contemplated by the invention.

The thickness of lamination 400 and lamination 500 is also preferably identical. The radius of rotor portion 502 of lamination 500 shown in FIG. 5, is less than the radius of rotor 402, shown in FIG. 4A, by the thickness of one lamination. The pole lengths in the stator portion 501 of lamination 500 shown in FIG. 5, are likewise less than the pole lengths of stator 401, shown in FIG. 4A, by the thickness of one lamination.

The tooth pitch of the linear step motor is determined by the thickness of the teeth and spacer lamination. As can be seen with reference to FIGS. 2 and 4A, the overall shape of stator sections 201 and 401 are very similar.

The step size obtained from the linear motor is a function of the lamination thickness. A typical lamination thickness for a step motor is 0.015 inch. In operation a single (full) step results in a translation equal to $\frac{1}{3}$ of the lamination thickness or 0.005 inch. Microstepping would result in a considerably smaller step size.

Figure 6:
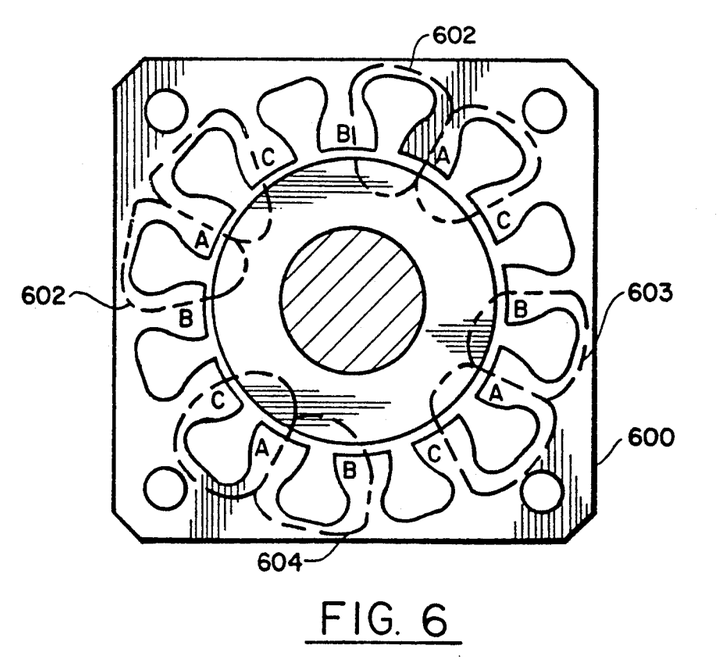
FIG. 6 depicts the magnetic flux paths for energization of a single phase of the linear motor fabricated in accordance with the teachings of the invention.

The magnetic flux paths for energization of the coils of phase A of the linear step motor depicted in FIG. 4A, is shown in FIG. 6. Phases A-C shown with respect to lamination 400 of FIG. 4A correspond to phases A-C shown with respect to lamination 600 in FIG. 6. This configuration distributes the linear motor translation forces equally around the circumference of the motor as shown by figure eight shaped loops 601–604 in FIG. 6. Other combinations of phase and poles are possible.

It should be noted that the rotor portion of the linear step motor depicted in FIGS. 1A and 1B, can be moved up or down relative to the stator in either direction by energizing phase $A_L$, $B_L$ or $C_L$, appropriately. Such techniques are well known to those skilled in the art and do not constitute a part of the invention per se.

Figure 7:
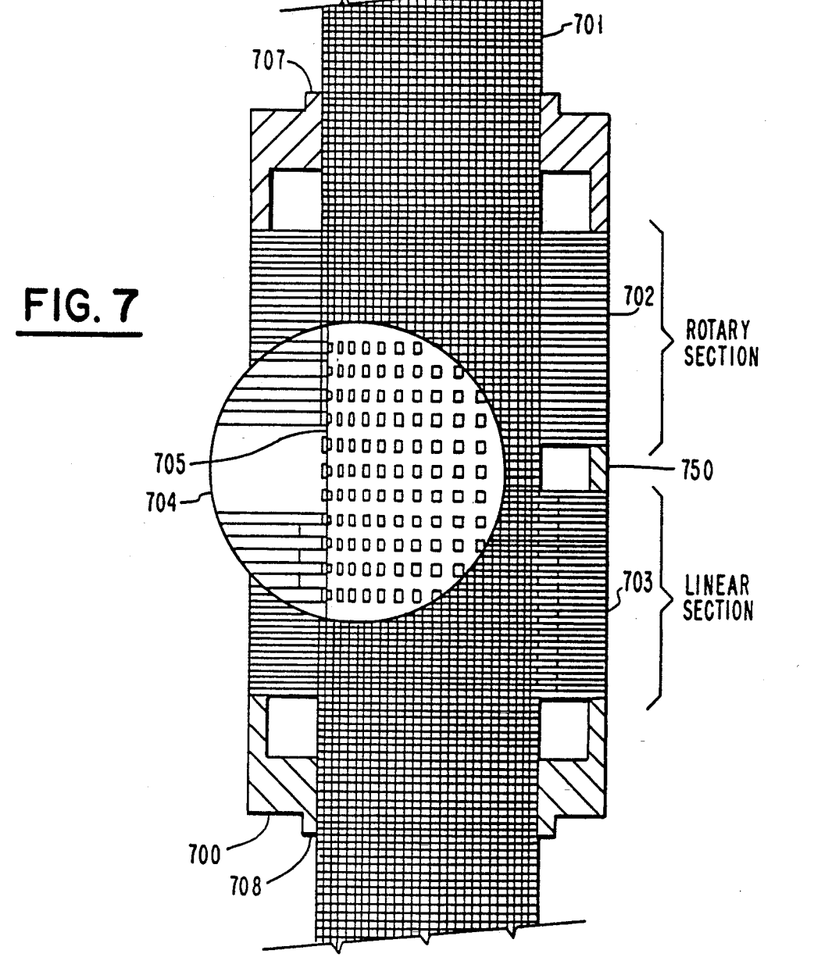
FIG. 7 depicts an alternate embodiment of the invention employing a waffle board like rotor.

Finally, with reference to FIG. 7, another embodiment of the invention is presented where the rotor 701 of motor 700 is fabricated from stacked laminations, in a waffle board like configuration (shown in the magnified portion of FIG. 7 at reference numeral 704) similar to the one discussed hereinbefore with reference to the Sawyer patent.

Stator laminations 702 and 703 for the rotary and linear sections of motor 700 respectively, are identical to stator portions of rotary and linear step motors 101 and 103 respectively, depicted in FIGS. 1A and 1B. The stator portions of the rotary step motor and linear step motor are shown in FIGS. 2 and 4 at 201 and 401 respectively. It should be noted that the stator laminations 702 and 703 are shown spaced by spacer 750 in FIG. 7, which serves the same purpose as spacer 150 in FIGS 1A and 1B.

The laminations for rotor 701 are each identical to the rotor lamination 202 shown in FIG. 2, separated from each other by spacers. The spacers contemplated by the invention are the same type of spacer shown in FIG. 5, at 502, used in the linear step motor described with reference to FIG. 5.

There are no magnets in the rotor depicted in FIG. 7. Motor 700 operates as a variable reluctance motor. Since the rotor laminations are identical for both rotary and linear motion, the rotor can be made as long as practical for a particular application, and the stroke is not limited by the length of the stator.

Furthermore, according to the alternate embodiment of the invention depicted in FIG. 7, the surface of the rotor, 705, is filled with a non-magnetic material (such as epoxy) and can be machined to a smooth surface so that air bearings can be used for suspension at both ends of the motor in end plates 707 and 708 shown in FIG. 7.

The Sawyer patent referred to hereinbefore, depicts a planar, non-laminated waffle board arrangement (not fabricated from stacked laminations) which, as previously pointed out, suffers from the potential for high eddy current losses and does not provide for combined linear and rotary motion, etc. However, the motor depicted in FIG. 7 solves these problems as well as providing the aforementioned advantages relative to stroke, etc.

What has been described in detail hereinabove is a combined linear-rotary direct drive step motor, and techniques for fabricating such a motor, meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A method for fabricating a linear-rotary direct drive step motor, including a linear portion and a rotary portion enclosed within a single housing, comprising the steps of:
   (a) fabricating the linear and rotary portions of said motor from laminations of thin magnetic sheet material;
   (b) inserting a common shaft between said linear and rotary portions of said motor; and
   (c) winding separate coils around the stator poles in each of said linear and rotary portions of said motor whereby the linear and rotary portions of said motor are capable of being independently operated.

2. A method as set forth in claim 1 further comprising the step of circumferentially spacing the teeth of a rotary step motor included in the rotary portion of said direct drive step motor, around the stator pole faces and the rotor portion of said rotary step motor.

3. A method as set forth in claim 2 further comprising the step of longitudinally spacing the teeth of a linear step motor included in the linear portion of said direct drive step motor, along the face of the stator poles and the rotor portion of said linear step motor.

4. A method as set forth in claim 3 further comprising the step of shaping the stator poles in each of said rotary step motor and said linear step motor in an identical fashion except for tooth placement on each stator pole.

5. A method as set forth in claim 3, wherein said linear step motor is an n-phase motor with n being an integer greater than or equal to 3, further comprising the step of distributing said n-phases around the stator portion of said linear step motor.

6. A method as set forth in claim 5 wherein the teeth associated with each motor phase are longitudinally displaced from the teeth in each circumferentially adjacent motor phase by 1/n times the lamination thickness.

7. A method for fabricating a linear-rotary direct drive step motor, including a linear portion and a rotary portion enclosed within a single housing, comprising the steps of:
   (a) fabricating the linear and rotary portions of said motor from laminations of thin magnetic sheet material;
   (b) utilizing stacked laminations to fabricate a common shaft to produce a waffle board configuration on a surface of said shaft and inserting said common shaft between said linear and rotary portions of said motor; and
   (c) winding separate coils around the stator poles in each of said linear and rotary portions of said motor.

8. A method as set forth in claim 7 further comprising the step of filling portions of said surface with a non-magnetic material.

9. A method as set forth in claim 8 further comprising the step of machining smooth said surface of said rotor, including the portion filled with said non-magnetic material, to accommodate supporting said shaft with air bearings.

10. A method as set forth in claim 9 further comprising the step of supporting said shaft with air bearings.

* * * * *